(12) United States Patent
Kuo et al.

(10) Patent No.: US 12,264,974 B2
(45) Date of Patent: Apr. 1, 2025

(54) IDENTIFICATION TAG

(71) Applicant: CYMMETRIK ENTERPRISE CO.,LTD., Taipei (TW)

(72) Inventors: Shan-Jen Kuo, Taipei (TW); Hsiu-Yu Lin, Taipei (TW); Jen-Chieh Wei, Taipei (TW)

(73) Assignee: CYMMETRIK ENTERPRISE CO., LTD., Taipei (TW)

( * ) Notice: Subject to any disclaimer, the term of this patent is extended or adjusted under 35 U.S.C. 154(b) by 878 days.

(21) Appl. No.: 17/133,298

(22) Filed: Dec. 23, 2020

(65) Prior Publication Data

US 2021/0262866 A1 Aug. 26, 2021

(30) Foreign Application Priority Data

Feb. 21, 2020 (TW) .................. 109105671

(51) Int. Cl.
  *G01K 11/04* (2006.01)
  *B65D 79/02* (2006.01)

(52) U.S. Cl.
  CPC .............. *G01K 11/04* (2013.01); *B65D 79/02* (2013.01)

(58) Field of Classification Search
  CPC ................................ G01K 11/04; B65D 79/02
  See application file for complete search history.

(56) References Cited

U.S. PATENT DOCUMENTS

| 1,917,048 | A | * | 7/1933 | Midgley, Jr. | ........... | B65D 79/02 62/1 |
| 2,662,018 | A | * | 12/1953 | Smith | .................... | G01K 11/12 62/123 |
| 2,716,065 | A | * | 8/1955 | Marenus | .................. | A23B 4/08 252/79 |
| 3,055,759 | A | * | 9/1962 | Busby | .................... | G01K 11/06 374/E11.006 |
| 3,065,083 | A | * | 11/1962 | Gessler | ................ | A23B 7/0441 374/106 |

(Continued)

FOREIGN PATENT DOCUMENTS

WO   WO-9424533 A1 * 10/1994   ............. G01K 11/06

OTHER PUBLICATIONS

TW-738429-B1; Kuo et al. "Identification Label For Setting On Cargo, Has Identifying Agent That Is Liquid And Filling Accommodating Space Of Label Body, When Identifying Agent Is At First Temperature Greater Than Freezing Point Of Identifying Agent" Sep. 2021 (Year: 2021).*

(Continued)

*Primary Examiner* — Son T Le
*Assistant Examiner* — Tania Courson
(74) *Attorney, Agent, or Firm* — Maschoff Brennan (57) ABSTRACT

The disclosure provides an identification tag including a bag body, an identification substance, and an identification component. The bag body is configured to be disposed on a product, and has a chamber. The identification substance is stored in the chamber. The identification substance is colored, and the state of the identification substance is changeable with temperature. When the identification substance is changed from one of the states to the other of the states, the identification substance has a volume increase and causes at least one crack on the bag body, wherein the at least one crack is connected to the chamber.

12 Claims, 6 Drawing Sheets

(56) References Cited

U.S. PATENT DOCUMENTS

| | | | | |
|---|---|---|---|---|
| 3,414,415 | A * | 12/1968 | Broad, Jr. | G01K 3/04 374/E3.004 |
| 4,022,149 | A * | 5/1977 | Berger | G01K 11/06 374/E11.006 |
| 4,154,107 | A * | 5/1979 | Giezen | G01K 11/16 374/102 |
| 4,457,252 | A * | 7/1984 | Manske | G01K 11/06 374/E11.006 |
| 4,846,095 | A * | 7/1989 | Emslander | G01K 11/06 374/E11.006 |
| 5,120,137 | A * | 6/1992 | Ou-Yang | G01K 3/04 374/102 |
| 5,129,731 | A * | 7/1992 | Ballin | G01K 11/06 374/E11.006 |
| 5,662,419 | A * | 9/1997 | Lamagna | G01K 3/04 374/102 |
| 5,779,364 | A * | 7/1998 | Cannelongo | G01K 11/06 374/E11.006 |
| 5,875,892 | A * | 3/1999 | Martin | H01L 21/67393 206/459.1 |
| 6,038,870 | A * | 3/2000 | Tiby | G01K 11/06 374/E11.006 |
| 7,209,042 | B2 * | 4/2007 | Martin | G06K 19/0717 340/572.1 |
| 7,343,872 | B2 * | 3/2008 | Taylor | G01K 11/12 374/E11.006 |
| 7,430,982 | B2 * | 10/2008 | Koivukunnas | G01K 11/16 374/162 |
| 7,490,575 | B2 * | 2/2009 | Taylor | G01K 3/005 374/106 |
| 7,675,409 | B2 * | 3/2010 | Jensen | G09F 3/0291 340/539.1 |
| 7,878,410 | B2 * | 2/2011 | Norrby | B41M 5/305 235/487 |
| 8,028,533 | B2 * | 10/2011 | Palin | G01K 11/06 62/66 |
| 8,061,294 | B2 * | 11/2011 | Suda | G01K 11/06 374/106 |
| 9,000,925 | B2 * | 4/2015 | Forster | G06K 19/07749 340/568.1 |
| 9,097,594 | B2 * | 8/2015 | Rastegar | G01K 11/06 |
| 9,297,706 | B2 * | 3/2016 | Smith | G01K 3/04 |
| 9,739,757 | B2 * | 8/2017 | Taylor | B32B 37/185 |
| 10,272,278 | B2 * | 4/2019 | Klug | A62C 3/06 |
| 11,209,205 | B1 * | 12/2021 | Bahammam | G04F 13/06 |
| 11,650,186 | B2 * | 5/2023 | Ferracane | B32B 7/027 116/206 |
| 11,734,539 | B2 * | 8/2023 | Nudel | G06K 19/0723 235/492 |
| 2003/0123519 | A1 * | 7/2003 | Bachrach | G01K 11/06 374/E11.006 |
| 2007/0245947 | A1 * | 10/2007 | Riemelmoser | G01K 3/04 374/102 |
| 2010/0020846 | A1 * | 1/2010 | Kagan | G01N 31/229 374/161 |
| 2012/0079981 | A1 * | 4/2012 | Huffman | G01K 1/02 116/207 |
| 2017/0229000 | A1 * | 8/2017 | Law | G06K 19/0717 |

OTHER PUBLICATIONS

CN-117636733-A; Chen et al., "Temperature Indicating Label And Manufacturing Method Thereof" Mar. 2024. (Year: 2024).*

* cited by examiner

IDENTIFICATION TAG

CROSS-REFERENCE TO RELATED APPLICATIONS

This non-provisional application claims priority under 35 U.S.C. § 119(a) on Patent Application No(s). 109105671 filed in Taiwan, R.O.C. on Feb. 21, 2020, the entire contents of which are hereby incorporated by reference.

TECHNICAL FIELD

The disclosure relates to an identification tag, more particularly to an identification tag responsive to temperature variation.

BACKGROUND

Transporting specific items, such as food, involves special precautions, such as temperature control. It is known that, during the food transportation, the food products need to be refrigerated or frozen to stop the growth of bacteria and other microorganisms. That is, temperature-controlled storage and transportation can keep food products safe and well-preserved.

Before the products getting to their destinations, they need go through categorizing and delivery processes, but these processes may not have restricted rules of temperature control. Thus, some of the food might not be kept at refrigerated and frozen temperatures during these processes, and it is not easy to notice from the appearances. As a result, not all of the food can be fresh as expected.

SUMMARY OF THE INVENTION

The disclosure provides an identification tag that can help staff on determining whether the product is preserved at the required temperature.

One embodiment of the disclosure provides an identification tag is configured to be disposed on a product. The identification tag includes a bag body and an identification substance. The bag body has a chamber. The identification substance is stored in the chamber. The identification substance is colored and is changeable between two different states. when the identification substance is changed from one of the states to the other of the states, the identification substance has a volume increase and causes at least one crack on the bag body, wherein the at least one crack is connected to the chamber.

Another embodiment of the disclosure provides an identification tag is configured to be disposed on a product. The identification tag includes a bag body, an identification component, and an identification substance. The bag body includes a first film and a second film. Peripheries of the first film and the second film are attached to each other, such that the first film and the second film together form a chamber therebetween, and the first film is configured to be attached on the product. The identification component is disposed on the first film. The identification substance is stored in the chamber and changeable between two different states. When the identification substance is changed from one of the states to the other of the states, the identification substance has a volume increase and causes at least one crack on the bag body, wherein the at least one crack is connected to the chamber.

According to the identification tags as discussed above, when the identification tag is in the second temperature lower than the freezing point of the identification substance, the identification substance has a volume increase to cause at least one crack on the bag body. As such, once the product with the identification tag is preserved in the first temperature higher than the freezing point of the identification substance during the delivery or storage of the product, the identification substance melt to be in the liquid state so as to leak out of the bag body from the crack. Therefore, the staff can visually determine the product is not preserved in an expected temperature by the appearance of the identification tag and the variation of the amount of the identification substance.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
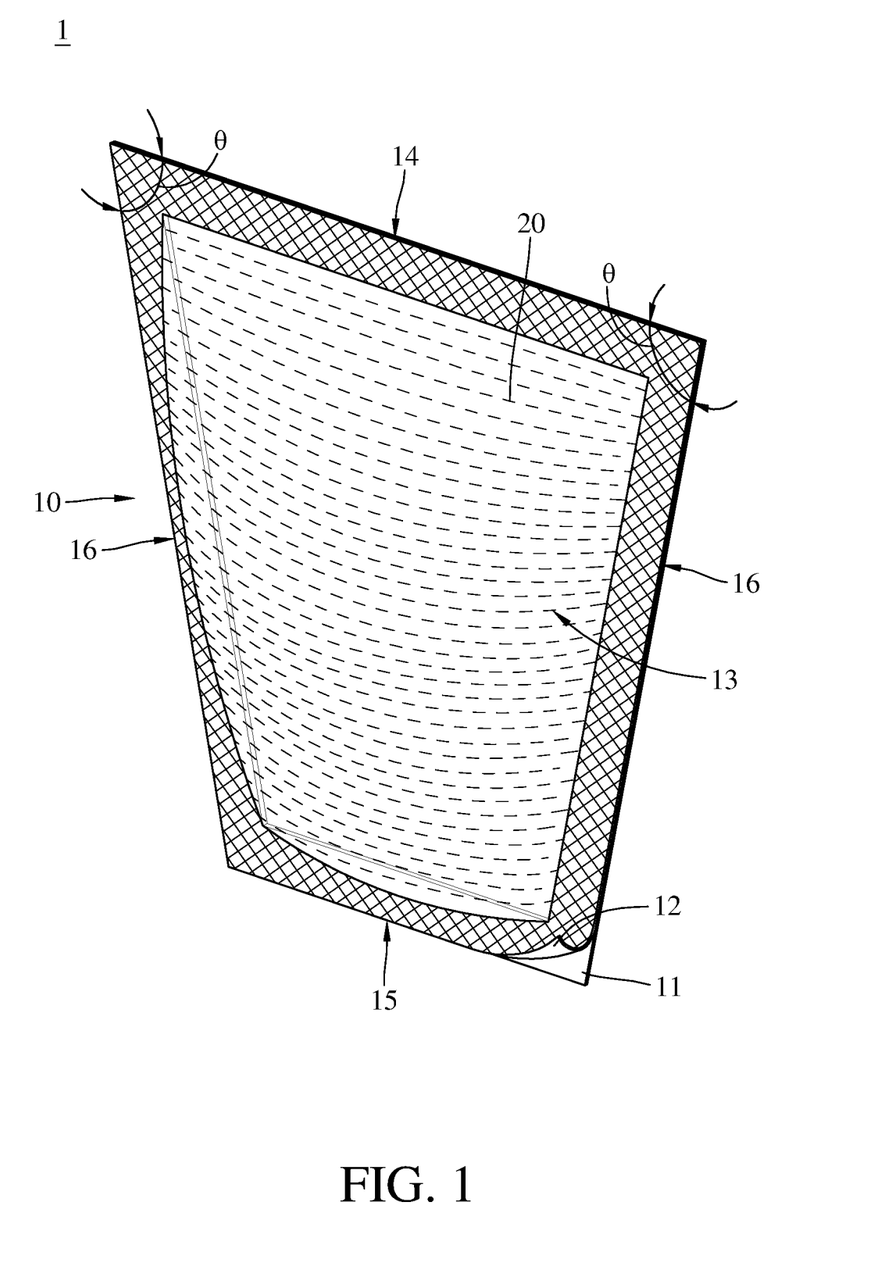
FIG. 1 is a perspective view of an identification tag according to a first embodiment of the disclosure.
Figure 2:
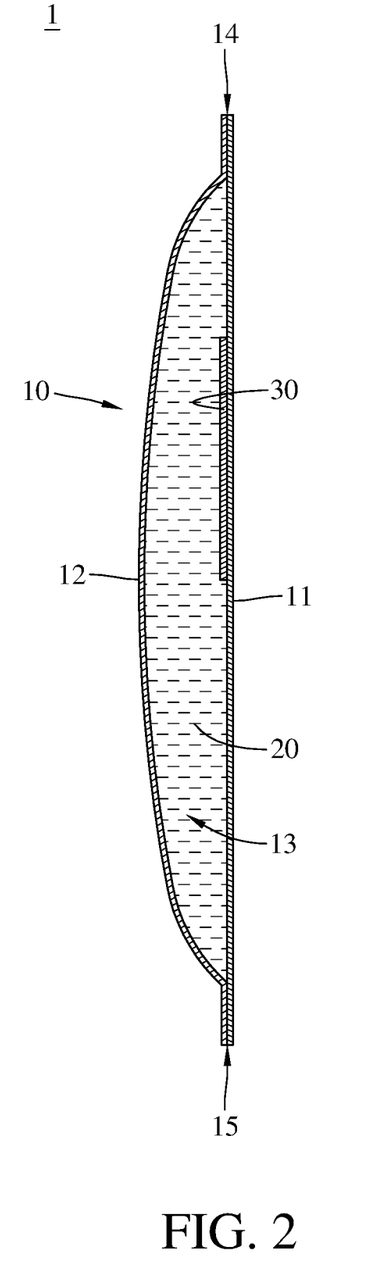
FIG. 2 is a cross-sectional view of the identification tag in FIG. 1.

Referring to FIGS. 1 and 2, there are shown a perspective view of an identification tag 1 according to the first embodiment of the disclosure and a cross-sectional view of the identification tag 1 in FIG. 1.

Figure 3:
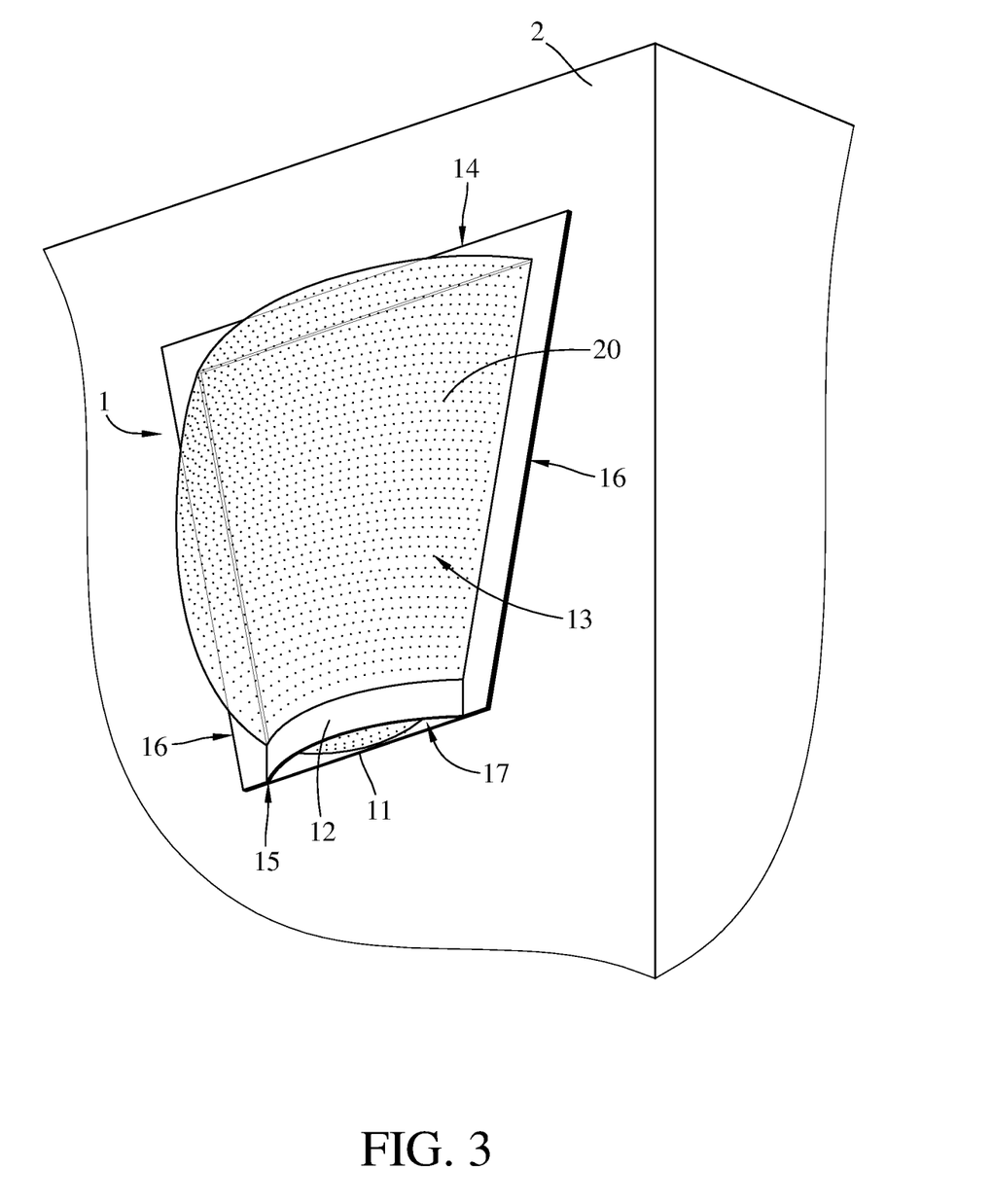
FIG. 3 is a perspective view of the identification tag in FIG. 1 when the identification tag is disposed on a product.

In this embodiment, the identification tag 1 is configured to be attached on a product 2 (shown in FIG. 3). The product 2 is, for example, a food product that needs freezing and frozen storage to keep it fresh. The identification tag 1 includes a bag body 10 and an identification substance 20. In addition, in this or another embodiment of the disclosure, the identification tag 1 may further include an identification component 30.

The bag body 10 includes a first film 11 and a second film 12. The first film 11 and the second film 12 may or may not be made of the same material. In one embodiment, both the first film 11 and the second film 12 may be made of plastic. In another embodiment, the first film 11 may be a metal film (e.g., an aluminum foil), and the second film 12 may be made of plastic. Peripheries of the first film 11 and the second film 12 are attached to each other by, for example, heat pressing, or via, for example, adhesive, or another suitable sealing manner. The first film 11 and the second film 12 together form a chamber 13 therebetween. The first film 11 is configured to be attached on the product 2. The second film 12 is light-permeable.

The bag body 10 has an upper portion 14, a lower portion 15, and two lateral portions 16. The upper portion 14 are connected to and located between the lateral portions 16, and the lower portion 15 is located opposite to the upper portion 14 and connected to and located between the lateral portions 16. As shown, the upper portion 14, the lower portion 15, and the lateral portions 16 together form a quadrilateral shape surrounding the chamber 13. Specifically, in this embodiment, the bag body 10 is in trapezoidal shape, where the upper portion 14 is parallel to the lower portion 15, and each of the lateral portions 16 is at an acute angle θ to the upper portion 14, thus the distance between the lateral portions 16 decreases from upper portion 14 towards the lower portion 15. In other words, the width of the bag body 10 decreases towards a direction from the upper side to the bottom side.

The identification component 30 can be a pattern printed on the inner surface of the first film 11, where the pattern can be in the form of a letter or a word; specifically, the identification component 30 is located on the surface of the first film 11 facing the second film 12. That is, the identification component 30 is located in the chamber 13 of the bag body 10. Note that the location of the identification component is not restricted; in some other embodiments, the identification component may be located outside the chamber of the bag body; specifically, the identification component may be located between the first film and the product, that is, the identification component may be printed on a surface of the first film facing away from the second film.

The identification substance 20 is stored in the chamber 13 of the bag body 10. As shown, the identification component 30 is covered by the identification substance 20. The identification substance 20 is, for example, a water-based colored substance that at least has phase transition between solid and liquid. As shown in FIG. 2, when the identification tag 1 is in a first temperature higher than the ice point or freezing point of the identification substance 20, the identification substance 20 is in liquid state and occupies the chamber 13 of the bag body 10, where the ice point of the identification substance 20 is, for example, 0 degree Celsius. In other words, herein, any temperature that is higher than the freezing point of the identification substance 20 is called the 'first temperature'.

Then, referring to FIG. 3, there is shown a perspective view of the identification tag 1 in FIG. 1 when the identification tag 1 is disposed on the product 2. It is noted that the product 2 needs to be preserved in a second temperature to keep it fresh, where the 'second temperature' means the temperatures that are lower than the ice point or freezing point of the identification substance 20. During the process of the product 2 is preserved in an environment of the second temperature, the temperature of the identification tag 1 goes down to the second temperature from the first temperature, thus the identification substance 20 is turning to the solid state from the liquid state. The volume of the identification substance 20 increases during this phase transition. And the volume increase of the identification substance 20 will expand the bag body 10 and eventually cause creasing and cracking on the bag body 10, as a crack 17 shown in FIG. 3. In this and other embodiments, the lower portion 15 tends to create the crack 17 than other side portions as the expansion of the chamber 13, thus the crack 17 can expose the bottom side of the chamber 13 to the outside. Note that the identification substance 20, in the second temperature, is solid and does not flow out of the bag body 10.

Figure 4:
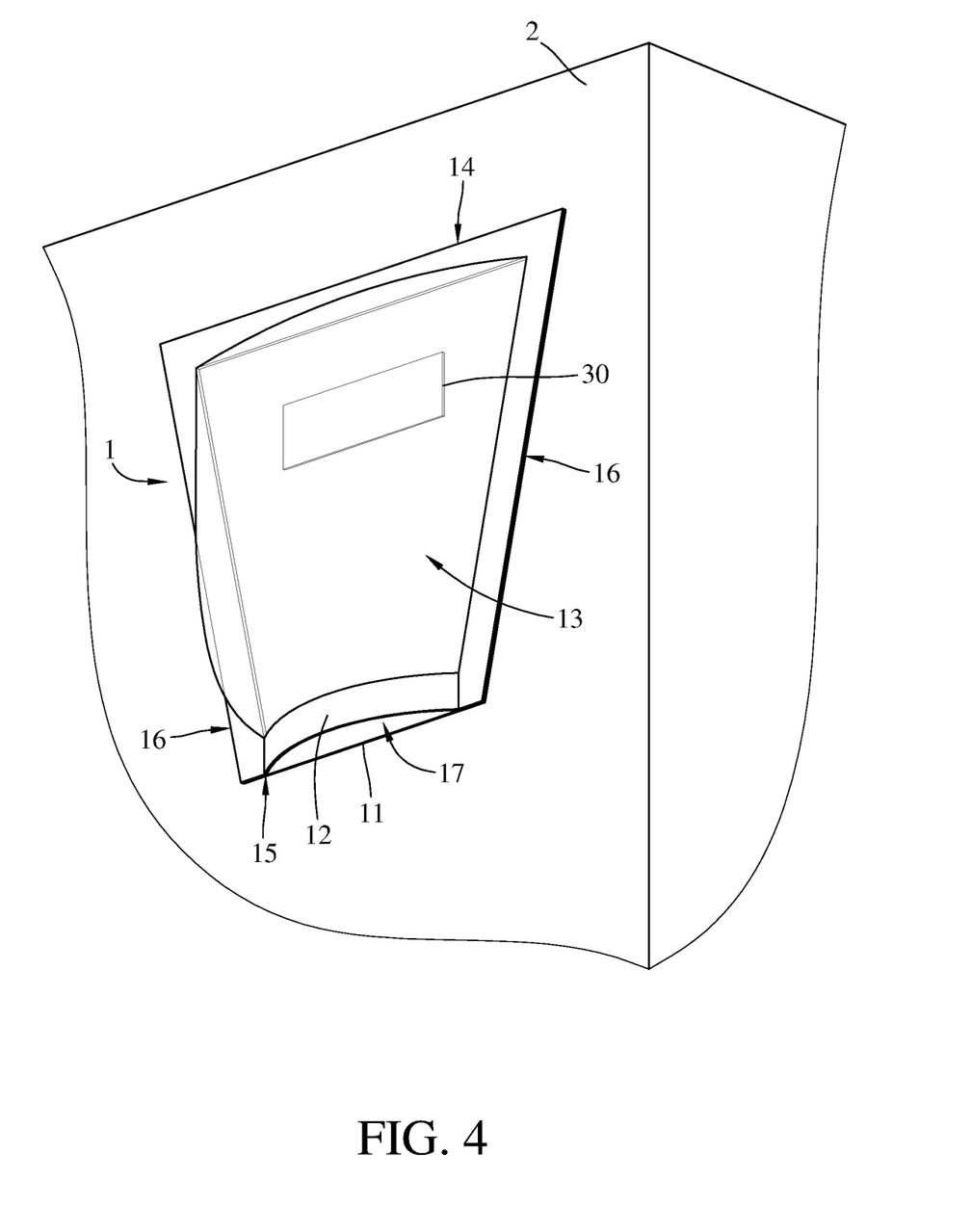
FIG. 4 is a perspective view showing that an identification substance leaks out of a bag body of the identification tag in FIG. 1.

However, referring to FIG. 4, when the temperature of the identification substance 20 increases to the first temperature, the identification substance 20 will start to melt and leak out of the bag body 10 through the crack 17. The leakage of the identification substance 20 can gradually uncover the identification component 30 therebehind. And the staff can visually notice the exposure of the identification component 30 so as to ensure that the product 2 is not preserved in the expected temperature range. In other words, if the temperature control has malfunctioned or the temperature of the product 2 is not in a suitable range (e.g., the first temperature), the identification substance 20 will leak out of the bag body 10 to expose the identification component 30, such that the identification tag 1 changes itself to another appearance, allowing the staff to visually determine the product 2 is preserved in an inappropriate temperature. This helps remove the unfresh products in advance to prevent them from entering into the market.

Note that the ice point or freezing point of the identification substance 20 can be modified as required by the actual temperature suitable for preserving the products. In one embodiment, the addition of salt to the identification substance 20 can reduce the freezing point of the identification substance 20. Similarly, the freezing point of the identification substance 20 can be changed by adding other suitable substances, such as organic substances (e.g., vinegar, methanol, ethanol, ethylene glycol, Glycerol) or inorganic substances (e.g., salt, ceramics, metals).

In addition, the trapezoidal shape of the bag body 10 helps the cracking to exist on the lower portion 15 of the bag body 10 during the volume increase of the identification substance 20, and such shape of the bag body 10 also helps the leaking of the liquid identification substance 20 through the crack 17. Note that the shape of the bag body 10 can be modified as required and is not intended to limit the disclosure; in some other embodiments, the bag body may be in triangular shape, rectangular shape, or irregular shape. Take the rectangular shape of the bag body for instance, the two lateral portions are perpendicular to the upper portion of the bag body, and the lateral portions are parallel to each other.

In one embodiment, the lateral portions and the upper portion of the rectangular bag body are made of the same material, and the lower portion of the rectangular bag body is made of a material different from that of the upper portion and the lateral portions. For example, the upper portion and the lateral portions of the bag body are formed by the attachment between a metal film (e.g., an aluminum foil film) and a plastic film, and the lower portions of the metal film and the plastic film are connected to each other via a thin film that is made of a material different from the metal film and the plastic film and easier to be cracked than the metal film and the plastic film, such that the lower portion of the bag body can be ensured to be cracked when the identification substance is solidified. In another embodiment, the areas of the upper portion and the lateral portions of the bag body may be larger than that of the lower portion of the bag body, such that the lower portion of bag body has a weaker structural strength than that of the upper portion and the lateral portions of the bag body, thereby also ensuring the crack is located at the lower portion of the bag body when the identification substance is solidified.

Further, the location of the crack 17 on the bag body 10 can be changed as required. In some other embodiments, the crack 17 may be arranged at another side of the bag body 10, such as the lateral portion of the bag body.

Moreover, the form of the identification component 30 can be changed as required. In some other embodiments, the pattern of the identification component may be a QR code, and the OR code allows the staff to scan to know the product 2 is preserved in the inappropriate temperature. In another embodiment, the identification component may be a near-field communication antenna (i.e., NFC antenna), a radio frequency identification antenna (i.e., RFID antenna), or imprint structure; in these cases, the identification substance may have or may not have a color. To the identification component of the NFC antenna or RFID antenna, when the identification substance is in the liquid state and occupies the chamber of the bag body, the identification substance covers and shields the identification component. After the identification substance leaks out of the bag body, the identification component is not shielded by the identification substance, such that the scan device can scan all of the identification tags on the products stored in the warehouse to determine which product is preserved in the inappropriate temperature and the total quantity of the products preserved in the inappropriate temperature. To the identification component of the imprint structure, the imprint structure is formed on the first film so as to make the first film have recess and protrusion portions. When the identification substance is in the liquid state and occupies the chamber of the bag body, the identification substance covers the imprint structure, such that the identification substance compensates the structural difference between the imprint structure and the first film, making the imprint structure difficult to be distinguish from the first film. However, when the identification substance leaks out of the bag body, the imprint structure is easily to be distinguish from the first film.

However, the identification component 30 can be optional; in some other embodiments, the identification tag may omit the identification component 30.

Figure 5:
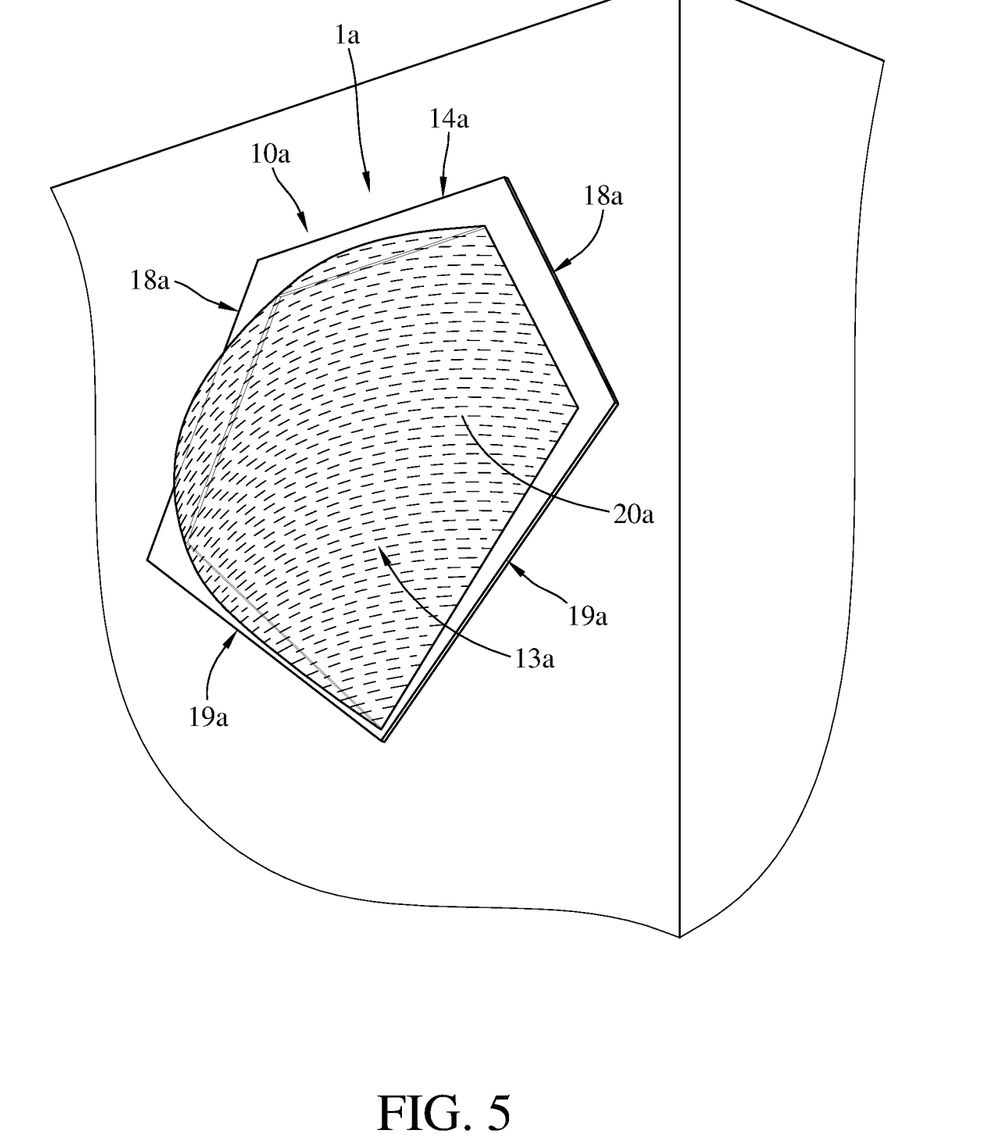
FIG. 5 is a perspective view of an identification tag according to a second embodiment of the disclosure.

Then, referring to FIG. 5, there is shown a perspective view of an identification tag 1a according to a second embodiment of the disclosure.

In this embodiment, the identification tag 1a is similar to the identification tag 1 shown in FIG. 1, therefore only the differences between this and previous embodiments will be described in detail in the following paragraphs.

In this embodiment, the identification tag 1a has, for example, a pentagonal shape, and the bag body 10a of the identification tag 1a are formed by attaching two films. The bag body 10a has an upper portion 14a, two first lateral portions 18a, and two second lateral portions 19a. Two opposite ends of the upper portion 14a are respectively connected to two ends of the first lateral portion 18a. Another ends of the first lateral portions 18a located away from the upper portion 14a are respectively connected to two ends of the second lateral portions 19a. Another ends of the second lateral portions 19a located away from the first lateral portions 18a are connected to each other. The upper portion 14a and the first lateral portions 18a of the bag body 10a have, for example, the same area, and the areas of the second lateral portion 19a of the bag body 10a respectively decrease from the ends of the second lateral portions 19a connected to the first lateral portions 18a towards the ends of the second lateral portions 19a connected to each other.

Figure 6:
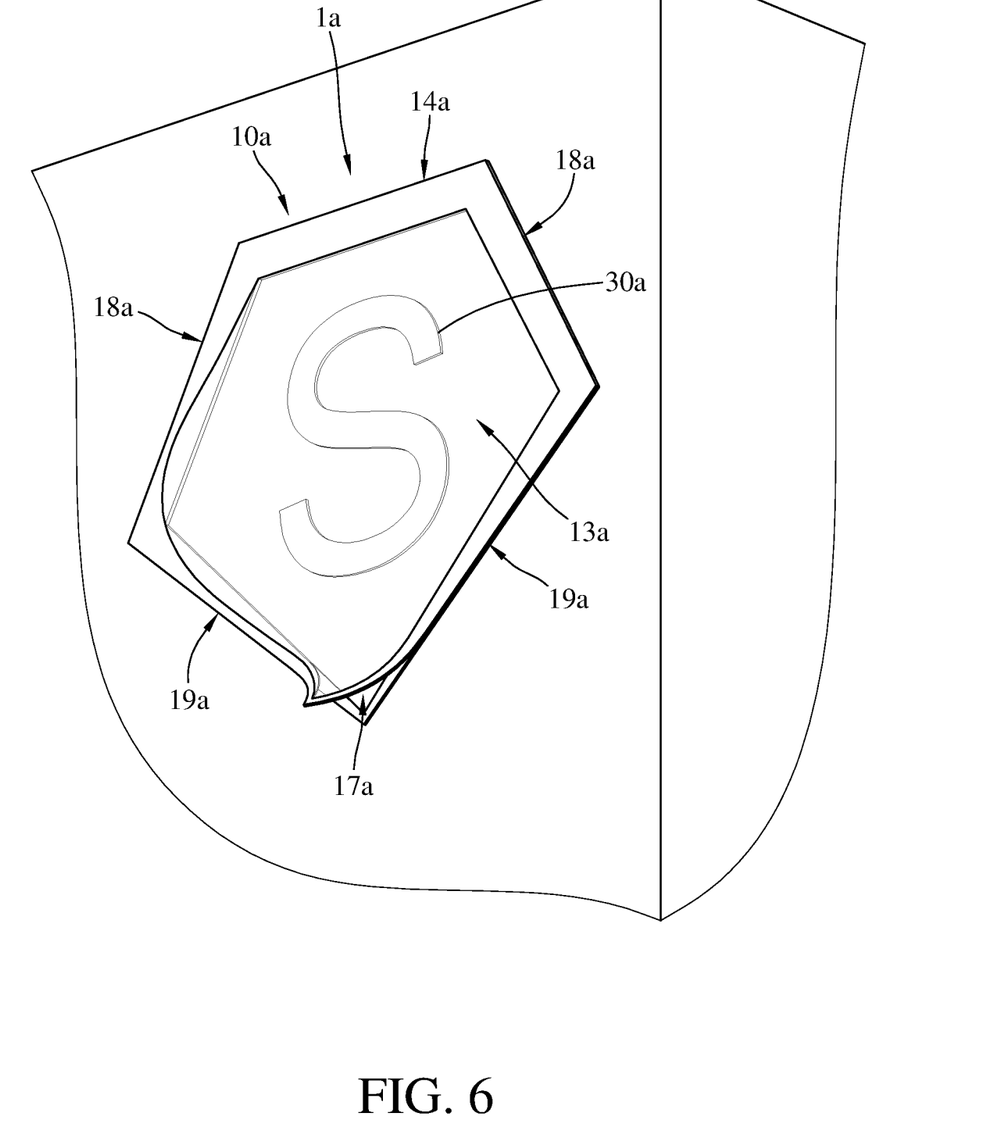
FIG. 6 is a perspective view showing that an identification substance leaks out of a bag body of the identification tag in FIG. 5.

Then, referring to FIG. 6, there is shown a perspective view showing that an identification substance leaks out of a bag body of the identification tag in FIG. 5.

When the identification substance 20a is solidified, the identification substance 20a has a volume increase and cause at least one crack 17a connected to a chamber 13a thereof. Since the area of the place where the second lateral portion 19a are connected to each other is the smallest among the upper portion 14a, the first lateral portions 18a, and the second lateral portions 19a, the crack 17a can be ensured to be located at such place. When the identification substance 20a melt to be in the liquid state, the identification substance 20a leaks out of the bag body 10a from the crack 17a, thereby exposing the identification component 30a. In this embodiment, the identification component 30a is a pattern in form of a letter, such as S.

Note that the location of the crack 17a on the bag body 10 can be changed as required. In some other embodiments, the crack 17a may be arranged any location of the first lateral portions 18a or the second lateral portions 19a.

According to the identification tags as discussed above, when the identification tag is in the second temperature lower than the freezing point of the identification substance, the identification substance has a volume increase to cause at least one crack on the bag body. As such, once the product with the identification tag is preserved in the first temperature higher than the freezing point of the identification substance during the delivery or storage of the product, the identification substance will melt to be in the liquid state so as to leak out of the bag body from the crack. Therefore, the staff can visually determine the product is not preserved in an expected temperature by the appearance of the identification tag and the variation of the amount of the identification substance.

Note that the type of the identification substance is not restricted in the disclosure; in some other embodiments, the identification substance may include carbon dioxide, and the identification substance has phase transition between solid and gas. In specific, when the identification substance stored in the body bag is in 1 atmosphere and a temperature lower than −78.5 degrees Celsius, the identification substance is in the solid state; when the identification substance stored in the body bag is in 1 atmosphere and a temperature higher than −78.5 degrees Celsius, the identification substance is changed to the gas state from the solid state, and the identification substance has a volume increase to cause at least one crack on the bag body. As such, the identification tag can be used for a product that required to be preserved in a temperature lower than −78.5 degrees Celsius. Therefore, the staff can visually determine the product is not preserved in an expected temperature by the appearance of the identification tag (e.g., the existence of the crack).

Moreover, the identification substance may further include colored substance (e.g., colored gas). By doing so, when the identification substance stored in the body bag is in 1 atmosphere and a temperature higher than −78.5 degrees Celsius, the identification substance may leak from the crack, causing the change of the color of the identification tag, thereby helping the staff determine the product is not preserved in an expected temperature.

On the other hand, in this disclosure, the crack on the bag body may be produced from the phase transition between liquid and gas of the identification substance. For example, the identification substance may be nitrogen. When the identification substance stored in the body bag is in 1 atmosphere and a temperature lower than −196 degrees Celsius, the identification substance is in the liquid state;

when the identification substance stored in the body bag is in 1 atmosphere and a temperature higher than −196 degrees Celsius, the identification substance is changed to the gas state from the liquid state, and the identification substance has a volume increase to cause at least one crack on the bag body. As such, the identification tag can be used for a product that required to be preserved in a temperature lower than −196 degrees Celsius.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An identification tag, configured to be disposed vertically on a product, comprising:
    a bag body, having a chamber; and
    an identification substance, stored in the chamber, wherein the identification substance is colored and is changeable between two different states;
    wherein when the identification substance is changed from one of the states to the other of the states, the identification substance has a volume increase and causes a crack on the bag body, wherein the chamber communicates with an outside of the identification tag via the crack;
    wherein the bag body comprises a first film and a second film, peripheries of the first film and the second film are attached to each other, such that the first film and the second film together form the chamber therebetween, the first film is configured to be attached on the product;
    wherein the at least one crack is located at the peripheries of the first film and the second film attached to each other, and the crack communicates with the chamber so as to allow the identification substance to leak out of the bag body;
    wherein the bag body has an upper portion, a lower portion, and two lateral portions, two opposite ends of the upper portion are respectively connected to ends of the two lateral portions, two opposite ends of the lower portion are respectively connected to another ends of the two lateral portions, the upper portion, the lower portion, and the two lateral portions together surround the chamber, and the at least one crack is located at the lower portion;
    wherein each of the two lateral portions is at an acute angle to the upper portion, and a distance between the two lateral portions decreases from the upper portion towards the lower portion.

2. The identification tag according to claim 1, wherein when the identification substance is changed from a solid state to a gas state, the identification substance causes the crack on the bag body.

3. The identification tag according to claim 1, wherein when the identification substance is changed from a liquid state to a gas state, the identification substance causes the crack on the bag body.

4. The identification tag according to claim 1, wherein when the identification substance is changed from a liquid state to a solid state, the identification substance causes the crack on the bag body, and the crack allows the identification substance to leak out of the bag body when the identification substance is changed from the solid state to the liquid state due to temperature increase.

5. The identification tag according to claim 1, wherein the upper portion, the lower portion, and the two lateral portions are the same material.

6. The identification tag according to claim 1, wherein the upper portion and the two lateral portions are the same material, and the lower portion is made of a material different from a material of the upper portion and the two lateral portions.

7. The identification tag according to claim 1, further comprising an identification component, wherein the identification component is disposed on the first film, and the identification substance covers the identification component.

8. The identification tag according to claim 7, wherein the identification component is a pattern of a word printed on the first film, and the identification component is disposed on a surface of the first film facing or facing away from the second film.

9. An identification tag, configured to be disposed vertically on a product, comprising:
    a bag body, comprising a first film and a second film, wherein peripheries of the first film and the second film are attached to each other, such that the first film and the second film together form a chamber therebetween, and the first film is configured to be attached on the product;
    an identification component, disposed on the first film; and
    an identification substance, stored in the chamber and changeable between two different states;
    wherein when the identification substance is changed from one of the states to the other of the states, the identification substance has a volume increase and causes a crack on the bag body, wherein the crack is connected to the chamber;
    wherein the crack is located at the peripheries of the first film and the second film attached to each other, and the crack communicates with the chamber so as to allow the identification substance to leak out of the bag body;
    wherein the bag body has an upper portion, a lower portion, and two lateral portions, two opposite ends of the upper portion are respectively connected to ends of the two lateral portions, two opposite ends of the lower portion are respectively connected to another ends of the two lateral portions, the upper portion, the lower portion, and the two lateral portions together surround the chamber, and the crack is located at the lower portion;
    wherein each of the two lateral portions is at an acute angle to the upper portion, and a distance between the two lateral portions decreases from the upper portion towards the lower portion.

10. The identification tag according to claim 9, wherein when the identification substance is changed from a solid state to a gas state, the identification substance causes the crack on the bag body.

11. The identification tag according to claim 9, wherein when the identification substance is changed from a liquid state to a gas state, the identification substance causes the crack on the bag body.

12. The identification tag according to claim 9, wherein when the identification substance is changed from a liquid state to a solid state, the identification substance causes the crack on the bag body and the crack allows the identification substance to leak out of the bag body when the identification substance is changed from the solid state to the liquid state due to temperature increase.

* * * * *